United States Patent [19]
Matsuda et al.

[11] Patent Number: 6,076,718
[45] Date of Patent: Jun. 20, 2000

[54] METHOD AND APPARATUS FOR CONVEYING EXPANDED FILM

[75] Inventors: Naohiko Matsuda; Hiroshi Segi, both of Matsusaka; Masami Nishitani, Mie; Shozo Takami, Inuyama; Akira Fukuchi, Ichinomiya, all of Japan

[73] Assignees: Central Glass Company, Limited, Yamaguchi; Toray Engineering Co., Ltd., Osaka, both of Japan

[21] Appl. No.: 08/506,599

[22] Filed: Jul. 25, 1995

[30] Foreign Application Priority Data

Jul. 27, 1994 [JP] Japan .................................. 6-175493

[51] Int. Cl.⁷ ........................... B65H 23/18; B65H 43/08; B65H 20/00
[52] U.S. Cl. .................. 226/4; 226/16; 226/24; 226/189
[58] Field of Search ................... 226/4, 15, 16, 226/24, 189

[56] References Cited

U.S. PATENT DOCUMENTS

| | | |
|---|---|---|
| 3,664,561 | 5/1972 | Feiertag . |
| 3,696,186 | 10/1972 | Stark et al. . |
| 4,554,713 | 11/1985 | Chabal . |
| 5,138,341 | 8/1992 | Kobayashi ........................ 226/16 |
| 5,219,109 | 6/1993 | Shirono ........................ 226/4 |
| 5,476,546 | 12/1995 | Zibulla ........................ 226/189 |

FOREIGN PATENT DOCUMENTS

| | | |
|---|---|---|
| 0 382 502 | 8/1990 | European Pat. Off. . |
| 0 469 866 | 2/1992 | European Pat. Off. . |
| 0 541 260 | 5/1993 | European Pat. Off. . |
| 0 606 829 | 7/1994 | European Pat. Off. . |
| 59-40778 | 10/1984 | Japan . |
| 5-12293 | 2/1993 | Japan . |
| 2 006 167 | 5/1979 | United Kingdom . |

OTHER PUBLICATIONS

Patent Abstracts of Japan, vol. 7, No. 47 (M–196) [1192] & JP–A–57 195055 (Hitachi Seisakusho K.K.) Nov. 30, 1982.
Patent Abstracts of Japan, vol. 6, No. 7 (c–087), Jan. 16, 1982, & JP–A–56 129648 (Central Glass Co., Ltd.) Oct. 09, 1981.
Patent Abstracts of Japan, vol. 10, No. 134 (M–479) [2191], May 17, 1986 & JP–A–60–258036 (Fuji Xerox K.K.), Dec. 19, 1985.
International Publication No. WO 91/07340, May 1991; Long.

Primary Examiner—Daniel P. Stodola
Assistant Examiner—Matthew A. Kaness
Attorney, Agent, or Firm—Evenson, McKeown, Edwards & Lenahan, PLLC

[57] ABSTRACT

A film conveying apparatus includes a conveying mechanism and a speed control mechanism. The conveying mechanism includes a plurality of lower rollers arranged in a lateral direction perpendicular to a film conveyed direction. The lower roller is equipped with a motor to variably control its speed. A plurality of upper rollers is disposed to correspond to the lower rollers so as to sandwich the continuous film with the lower rollers. The roller-speed control mechanism controls a rotation speed of each lower roller so that the film is conveyed at a desired speed in a desired direction.

8 Claims, 5 Drawing Sheets

METHOD AND APPARATUS FOR CONVEYING EXPANDED FILM

BACKGROUND OF THE INVENTION

1. Field of the Invention

The present invention relates to improvements in a method and apparatus for conveying a continuous synthetic-resin film, and more particularly to a system which smoothly conveys an expanded continuous synthetic-resin film from an expansion roller to a cutting device.

2. Description of the Prior Art

Various film conveying systems have been proposed and in practical use. Japanese Patent No. 59-40778 discloses a typical film conveying apparatus which is installed downstream of a continuous film expanding apparatus for sector-shape intermediate films of laminated glasses. The film conveying apparatus is constituted by a fetch roller unit and a belt conveyer unit so that a continuous sector-shape (curved) film can be smoothly conveyed to a film cutting apparatus. The fetch roller unit is rotated at a speed higher than a speed at a maximum diameter portion of a taper roller of the continuous film expanding apparatus so as to convey the formed film to the belt conveyer unit while applying a predetermined extension to the film. The belt conveyer unit is constituted by plural belts and two shafts with plural pulleys to form a sector-shape conveying surface where a film conveying speed is set to be gradually increased from an inner side to an outer side. Accordingly, this conventional apparatus enables a sector-shape continuous film to be smoothly conveyed to the next stage.

However, this film conveying apparatus is complicated in structure and is not easy to be speedily applied to various kinds of films, such as a sector-shape (curved) film and a straight film.

SUMMARY OF THE INVENTION

It is an object of the present invention to provide a film conveying method and apparatus which can be flexibly applied to various films with accuracy and rapidity while keeping the qualities of the films during operation.

An aspect of the present invention resides in a method for conveying a continuous synthetic-resin film. A plurality of roller units, each of which is constituted by a lower roller equipped with a driver and an upper roller disposed above the lower roller, is arranged in the direction perpendicular to a conveyed direction of the continuous film. The roller units sandwich and convey the continuous film. A rotation speed of each roller unit is controlled so that the film is conveyed at a desired speed and in a desired direction.

Another aspect of the present invention resides in an apparatus for conveying a continuous synthetic-resin film. The apparatus comprises a conveying mechanism which includes a plurality of lower rollers which are arranged in a lateral direction perpendicular to a conveyed direction of the continuous film and equipped respectively with drivers. A plurality of upper rollers is disposed so as to correspond to the lower rollers so as to sandwich the continuous film with the lower rollers. Additionally, a roller-speed control mechanism controls a rotation speed of each of the lower rollers of said conveying mechanism so that the film is conveyed at a desired speed in a desired direction.

With the thus arranged film conveying system, expanded continuous synthetic-resin film formed into a sector-shape is treated, even if its shape or conveying speed is changed, this film conveying system accurately and efficiently conveys the modified film without injuring or involving the film in some troubles. That is, this system ensures an available film conveying method which smoothly and automatically conveys an expanded film.

DETAILED DESCRIPTION OF THE INVENTION

Figure 1:
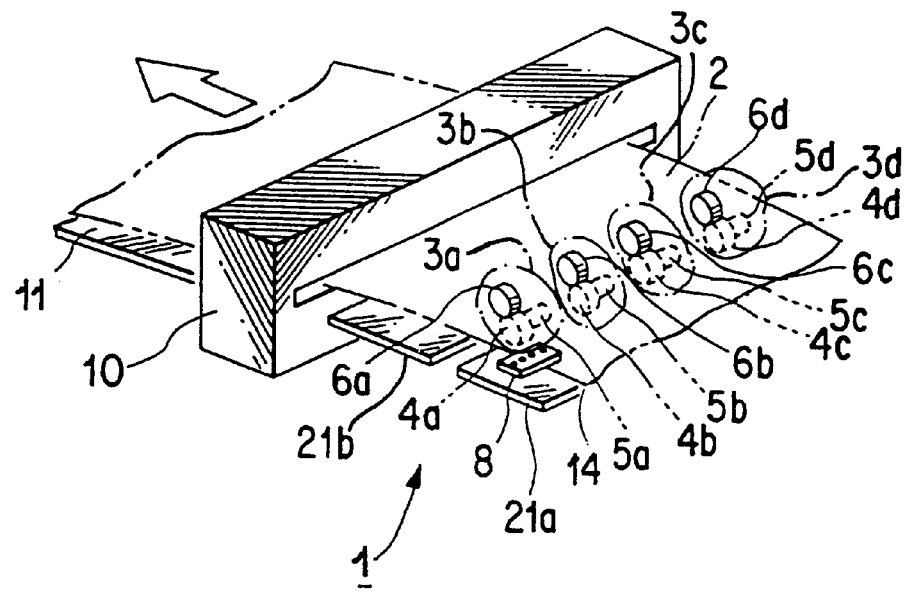
FIG. 1 is a perspective view of a first embodiment of a film conveying system according to the present invention.
Figure 2:
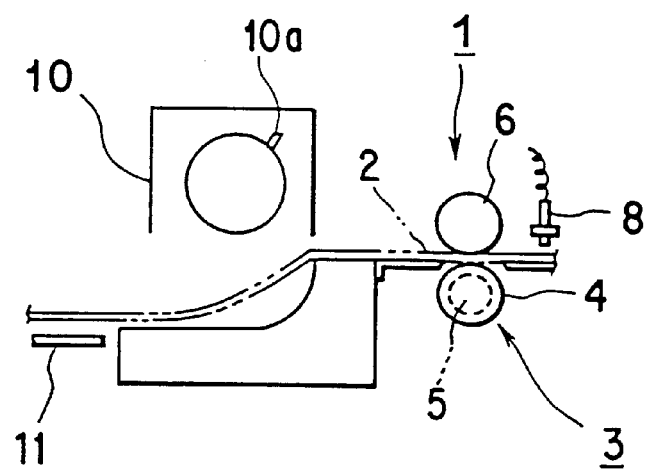
FIG. 2 is a side view of the first embodiment of the film conveying system of FIG. 1.

Referring to FIGS. 1 and 2, there is shown a first embodiment of a method and apparatus for conveying an expanded synthetic-resin film according to the present invention.

As shown in FIG. 1, the film conveying apparatus 1 comprises a first, second, third and fourth roller units 3a, 3b, 3c and 3d which convey an expanded continuous film 2 in the direction indicated by the white arrow. The first to fourth roller units 3a to 3d are disposed in the direction perpendicular to a conveyed direction of the continuous film 2 with a predetermined distance between adjacent units. In this embodiment, the continuous film 2 is of a synthetic-resin film such as a PVB film and is applied to an intermediate film for a normal laminated glass. Each roller unit 3 (3a, 3b, 3c or 3d) comprises a lower roller 4 (4a, 4b, 4c or 4d) and an upper roller 6 (6a, 6b, 6c or 6d) which are made of resilient material such as urethane rubber. The first, second, third and fourth lower rollers 4a to 4d are disposed between tables 21a and 21b located upstream of a cutter unit 10, as shown in FIGS. 1 and 2. Each of the lower rollers 4a to 4d is provided with a drive motor 5 (5a, 5b, 5c or 5d) so that a conveying speed of the film 2 is variably changed. The drive motor 5 is of a speed controlled type which variably changes its speed within a predetermined range, such as an inverter operated induction motor. The first, second, third and fourth lower rollers 6a to 6d are disposed between the tables 21a and 21b and under the film 2 so as to be rotated anticlockwise in FIG. 2 while their rolling surfaces are set slightly higher than the top surface of the tables 21a and 21b in height level. The first, second, third and fourth upper rollers 6a, 6b, 6c and 6d are disposed to sandwich the continuous film 2 with the corresponding first, second, third and fourth lower rollers 4a, 4b, 4c and 4d so that the film 2 is smoothly conveyed toward a cutter unit 10. The cutter unit 10 has a cutting edge section 10a at which the continuous film 2 is periodically cut into desired-length films. The cut films 2 are conveyed to an air table 11 which supports the cut films 2 by jet air.

A drift detector 8 is installed upstream of the roller units 3a to 3d and above the film 2 in order to detect the position of the inner lateral edge 14 of the film 2. The drift detector 8 comprises four sensors 9 (9a to 9d) which respond to the existence of the film thereabove. Therefore, by the operational combination of the sensors 9a to 9d, the drift detector 8 can detect the drift (lateral shift) amount of an inner lateral edge 14 of the film 2. The detected drift amount is feedbacked to the first, second, third and fourth motors 5a to 5d in order to control the drift amount in a predetermined value by changing the speed of the respective motors 5a to 5d according to the detected drift amount.

Figure 9:
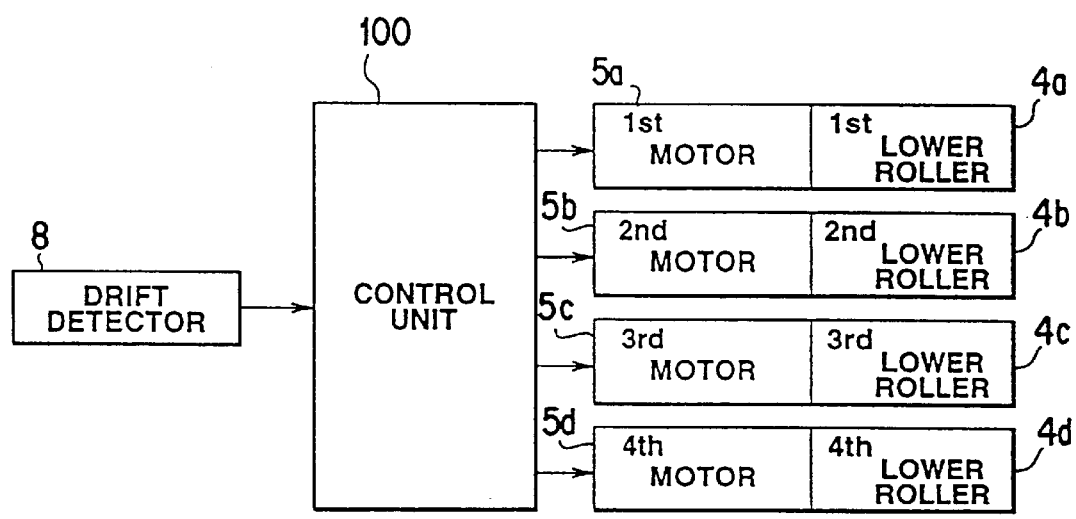
FIG. 9 is a block diagram of a drift control system of the film conveying system according to the present invention.

More particularly, the drift detector 8 is electrically connected with a control unit 100 which is electrically connected with the first to fourth motors 4a to 4d, as shown in FIG. 9. The drift detector 8 outputs a signal indicative of the film drift condition to the control unit 100 which is constituted by a micro processor. The control unit 100 outputs correction signals to the respective roller units 3a to 3d through the respective motors 5a to 5d according to the received signal so as to decrease the drift amount of the film 2.

According to an experimental trial of this embodiment, when the film 2 was conveyed at the conveying speed V ranging from 2 to 10 m/min., the roller units 3a to 3d were adjustably controlled and the film conveying apparatus according to the present invention was operated stable.

With the thus arranged film conveying system, the expanded synthetic-resin film 2 is treated accurately and efficiently without being injured or involved in some troubles. That is, this film conveying apparatus ensures an available film conveying method which smoothly and automatically conveys an expanded film.

Referring to FIGS. 3 to 8, there is shown a second embodiment of the film conveying method and apparatus according to the present invention.

Figure 3:
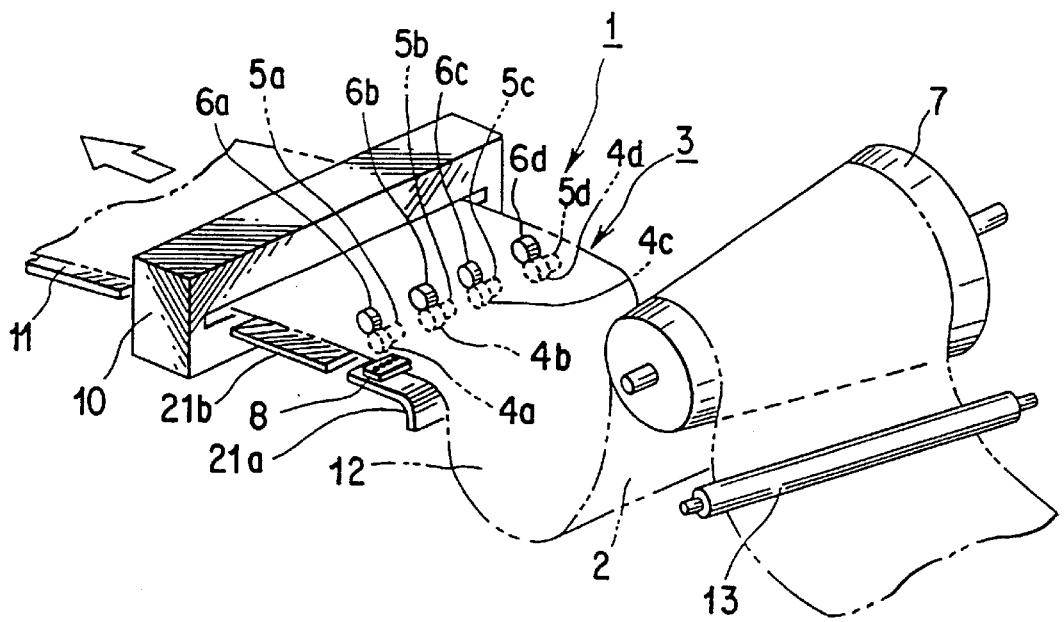
FIG. 3 is a perspective view of a second embodiment of the film conveying system according to the present invention.
Figure 4:
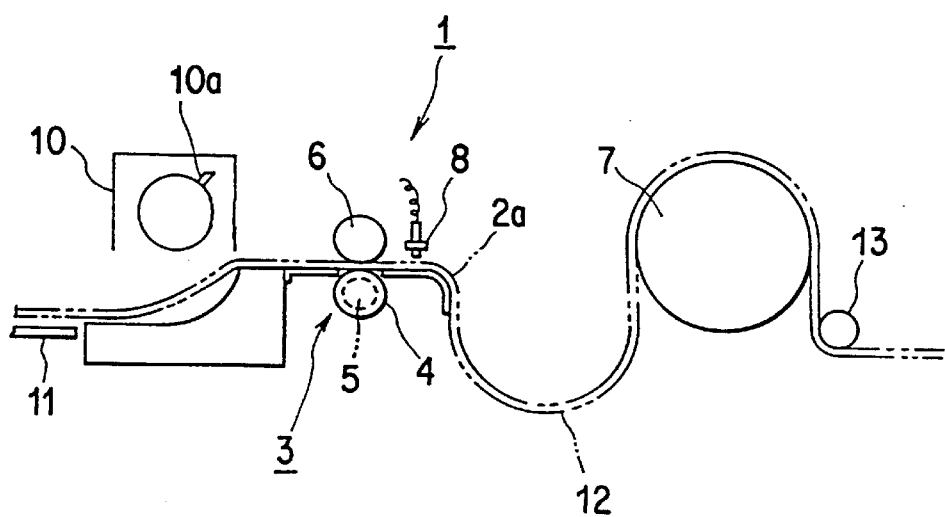
FIG. 4 is a side view of FIG. 3.

As shown in FIGS. 3 and 4, a continuous synthetic-resin film 2 is conveyed to an expansion roller 7 of a truncated cone (generally conical) shape while being pressed by a pressure roller 13. The expansion roller 7 processes the continuous film 2 into a sector form. For example, the continuous film 2 is stretched to a configuration in which the edges of the material are curved with opposite lateral edges (inner and outer lateral edges) 14 and 15 having a different arc length by a so-called umbrella method. Such an expansion method is disclosed in U.S. Pat. No. 3,696,186. The continuous film 2 formed into a sector shape is then conveyed to the cutter unit 10 through the first to fourth roller units generally designated 3. The continuous film 2 forms a loosened (sagged) section 12 between the expansion roller 7 and the roller units 3. The sagged section 12 of the continuous film 2 functions to decrease or delete a conveying speed applied by the expansion roller 7.

As similar to the apparatus of the first embodiment of FIGS. 1 to 2, each of the first to fourth roller units 3 the second embodiment comprises a lower roller 4 (4a, 4b, 4c or 4d) and an upper roller 6 (6a, 6b, 6c or 6d). The first, second, third and fourth lower rollers 4a to 4d are disposed between tables 21a and 21b located upstream of the cutter unit 10, as shown in FIGS. 3 and 4. Each of the lower rollers 4a to 4d is provided with a drive motor 5 (5a, 5b, 5c or 5d) so as to be variably driven in speed. A drift detector 8 is installed upstream of the roller units 3 and detects the drift amount of the inner lateral edge 14 of the film 2. The detected drift amount is feedbacked to the drive motors 5a to 5d in order to control the drift amount in a predetermined value by changing the speed of the respective motors 5a to 5d according the detected drift amount. The continuous film 2 is conveyed to the cutter unit 10 through the roller units 1a to 1d and is cut into desired-length (longitudinal dimension) films 2. The cut films 2 are further conveyed to a downstream side by an air table 11 which is disposed downstream of the cutter unit 10.

Figure 5:
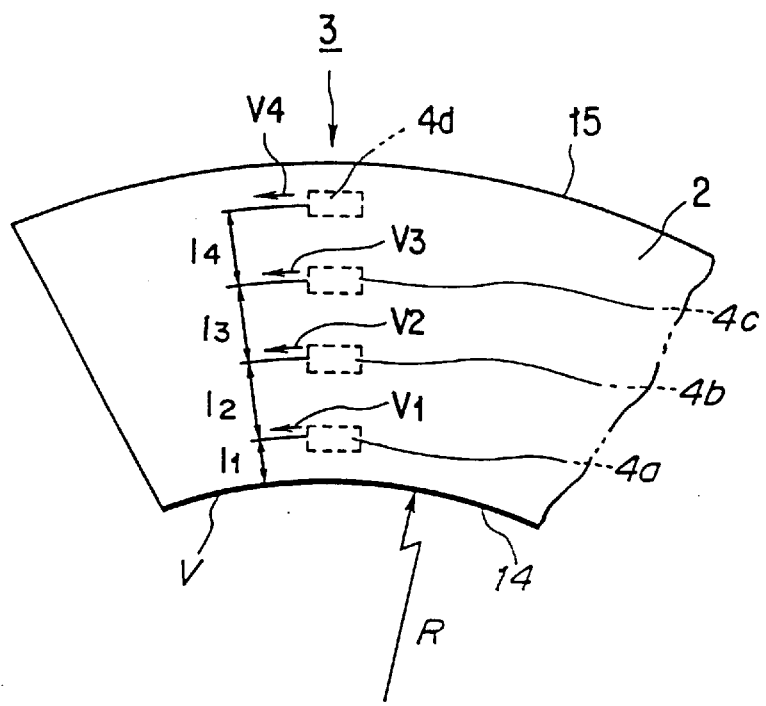
FIG. 5 is a partial top view of FIG. 4 which shows a relationship between the roller speeds and the radius of the curvature of the sector-shaped film.
Figure 6:
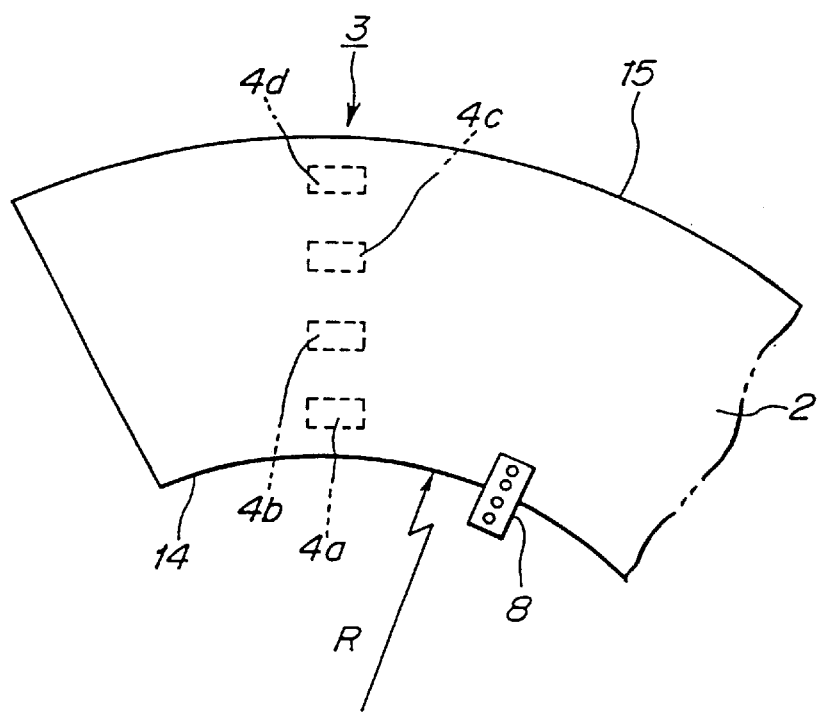
FIG. 6 is another top view which shows an attached condition of the drift detector.

As shown in FIG. 5, each of the roller units 3 is disposed with a predetermined interval relative to an adjacent one. More particularly, a first interval between the inner lateral edge 14 and a center of the first lower roller 4a is set at $l_1$, a second interval between the center of the first lower roller 4a and a center of the second lower roller 4b is set at $l_2$, a third interval between the center of the second lower roller 4b and a center of the third lower roller 4c is set at $l_3$, and a fourth interval between the center of the third lower roller 4c and a center of the fourth lower roller $4_d$ is set at $l_4$. The continuous sector-shape film 2 is supplied to the roller units 3a to 3d and is conveyed at various conveying speeds according to the radius positions of the roller units 3a to 3d. When the sector-shape film 2 is conveyed so that the conveying speed at the inner lateral edge 14 of the film 2 is V wherein the radius of the curvature of the inner lateral edge 14 is R, the first to fourth lower rollers 4a to 4d convey the film 2 at the speeds $V_1$, $V_2$, $V_3$ and $V_4$, respectively. The relationship between the speeds $V_1$ to $V_4$ of the lower rollers 4a to 4d and the dimensions of the lower rollers 4 and the film 2 can be represented from the above dimensional definition as follows:

$$V_1 = [(R+l_1)/R]V \qquad (1)$$

$$V_2 = [(R+l_1+l_2)/]V \qquad (2)$$

$$V_3 = [(R+l_1+l_2+l_3)/R]V \qquad (3)$$

$$V_4 = [(R+l_1+l_2+l_3+l_4)/R]V \qquad (4)$$

Figure 8:
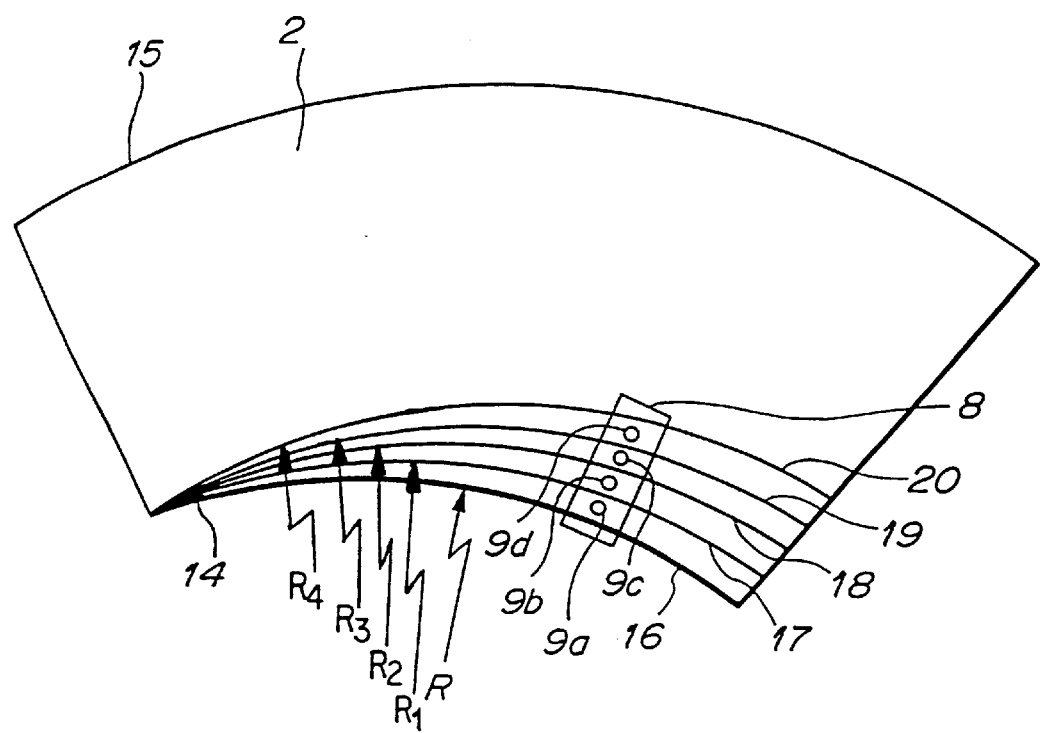
FIG. 8 is a top view which shows various drifted conditions of the sector-shape film relative to the drift detector.

In a sector-shape forming process of the film 2, a dimensional error and an error in the speed control generate a lateral drift of the film 2 as shown in FIG. 8. The drift detector 8 detects the drift amount of the lateral edge of the film 2, that is, the shift amount from a standard position. On the basis of the detected drift amount, a correction radius $R_1$ of the curvature of the inner lateral edge is calculated. Then, each corrected speed of each lower roller 4a, 4b, 4c or 4d is calculated by using the equations (1) to (4) and $R_1$ instead of R, and the drift amount of the film 2 is corrected upon comparing the obtained speeds with predetermined speeds (base speeds) of the respect lower rollers 4a to 4d so as to return the film 2 to a standard position.

Figure 7:
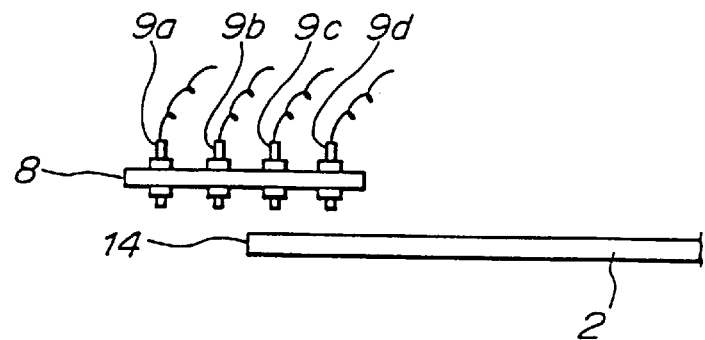
FIG. 7 is an enlarged side view which shows a positioning of the drift detector relative to the film.

As shown in FIG. 7, the drift detector 8 comprises four sensors 9a to 9d which are turned on when the film 2 passes thereunder. According to the turned-on condition of the sensors 9a to 9d, the drift amount of film 2 is acknowledged by the control unit 100. The drift control operation in this film conveying apparatus according to the present invention will be discussed hereinafter with reference to FIG. 8.

First, when the sector-shape film 2 is put in a first condition 16 with respect to the drift detector 8, the first to fourth sensors 9a to 9d are all turned on. Similarly, the second and the third and the fourth sensors 9b, 9c and 9d are turned on when the film 2 is put in a second condition 17, the third and the fourth sensors 9c and 9d are turned on when put in a third condition 18, only the fourth sensor 9d is turned on when put in a fourth condition 19, and none of the sensors is turned on when put in a fifth condition 20. In this second embodiment, normally the roller units 3 are controlled such that the film 2 is set in the third condition 18 which is defined as a normal condition.

When the sector-shape film 2 has been drifted from the third condition 18 to the fourth condition 19, that is, when only the fourth sensor 9d is turned on, the control unit 100 judges that the sector-shape film 2 is put in the fourth condition 19, and outputs the control signal to the respect motors 5a to 5d to change the lower roller speeds. More particularly, the control unit 100 changes the base radius R by multiplying the correction coefficient, such as 1.1, to the base radius R of the curvature of the inner lateral edge for obtaining the correction radius $R_1$. On the basis of the correction radius $R_1$, the respective speeds of the lower rollers 4a to 4d are calculated. By this correction, the speed of the first roller 4a is relatively increased as compared with the speed V in the normal (standard) condition 18. Accordingly, the film 2 is drifted so as to be returned to a standard condition by the drifted amount.

Next, when the film 2 is still put in the fifth condition 19 even by the above correcting operation, the control unit 100 multiples a further larger correction coefficient, such as 1.2, to the standard radius R for obtaining the other correction radius $R_2$. By using this correction radius $R_2$, the relative speeds of inner side rollers 4a and 4b are further increased so that the film 2 is further largely returned to the standard condition by the drift amount.

On the other hand, when the film 2 is put in the second condition 18, that is, when the film 2 is drifted to the inner lateral side from the normal position, the control unit 100 multiples a smaller correction coefficient (such as 0.9) to the standard radius R for obtaining the correction radius $R_3$. By using this correction radius $R_3$ as a radius R of the curvature of the inner lateral edge of the film 2 for the calculation of the speeds of the respective lower rollers 4a to 4d, the relative speeds of the outer side rollers 4c and 4d are increased as compared with the speed in the standard condition 18. Therefore, the film 2 is approached to the standard position so as to decrease the drift amount.

Further, when the film 2 is further drifted to the inner side that is, when the film 2 is put in the first condition 16 even by the above correcting operation, the control unit 100 multiples a further effective correction coefficient, such as 0.8, to the standard radius R for obtaining the other correction radius R4. By using this correction radius $R_4$, the relative speeds of the outer side rollers 4c and 4d are further increased so that the film 2 is further largely drifted to the standard position.

It will be understood that the film conveying system according to the present invention may be applied to various films which are continuously expanded synthetic-resin films. Further, this system can be applied to a continuous film which is formed into a special shape and should keep its surface clean so as to keep no-cloud and no-wrinkle surface while keeping an efficient productivity. In particular, it is preferable to apply this system to an intermediate film for a laminated glass which film is continuously expanded into a sector-shape, such as a PVB film.

Furthermore, the film conveying method and apparatus according to the present invention can be applied to various film expanding methods and apparatuses, such as to a method and apparatus for expanding an intermediate film for a laminated glass disclosed in Japanese Patent No. 5-12293 and a method for expanding a resilient material which is disclosed in U.S. Pat. No. 3,696,186.

Although in the preferred embodiments of the present invention a plurality of lower rollers are arranged in the lateral direction of the synthetic-resin film and a plurality of upper rollers are arranged in correspond to the respective lower rollers so as to sandwich the film with the lower rollers, it is preferable that about three or four roller units of the upper and lower rollers are disposed at about 200 mm intervals in order to smoothly convey the above mentioned film. Furthermore, while the rollers in this apparatus are not limited in mentioned the preferred embodiments, such rollers may have a predetermined width and have a diameter of 50–100 mm. Although the material of the rollers may not be limited in a special compounds, it is preferable to use a material which does not make the film dirty or injure it, such as urethane rubber.

While the invention has been described in its preferred embodiments, it is to be understood that the words which have been used are words of description rather than limitation and that changes within the purview of the appended claims maybe made without departing form the true scope and spirit of the invention in its broader aspects.

What is claimed is:

1. A method for conveying a continuous synthetic-resin film comprising the steps of:

arranging a plurality of roller units in a direction perpendicular to a conveying direction of the continuous film, each of the roller units being constituted by a lower roller equipped with a driver and an upper roller disposed above the lower roller, the roller units sandwiching the continuous film to convey the continuous film;

stretching the continuous film to a configuration in which edges of the film are curved with opposite lateral edges having different arc lengths; and controlling a rotation speed of each roller unit so that the film is conveyed at a desired speed and in a desired direction by correcting the rotation speed of each lower roller from a preselected value according to a drift amount of the film in a film lateral direction perpendicular to a film conveyance direction.

2. A method as claimed in claim 1, and further comprising the step of decreasing a conveying force at an upstream side of the roller units.

3. A method as claimed in claim 2, wherein the conveying force is decreased in a U-shaped sagged section of the film.

4. A method as claimed in claim 1, and further comprising the step of forming the continuous film into a sector-shape at an expansion roller.

5. A method for conveying a continuous synthetic-resin film comprising the steps of:

arranging a plurality of roller units in a direction perpendicular to a conveying direction of the continuous film, each of the roller units being constituted by a lower roller equipped with a driver and an upper roller disposed above the lower roller, the roller units sandwiching the continuous film to convey the continuous film;

stretching the continuous film to a configuration in which edges of the film are curved with opposite lateral edges having different arc lengths; and controlling a rotation speed of each roller unit so that the film is conveyed at a desired speed and in a desired direction according to a radius of a curvature of an inner lateral edge of the film and relative to a preselected rotation speed value of each roller unit.

6. A method as claimed in claim 5, and further comprising the step of correcting the preselected rotation speed value according to a drift amount in a lateral direction of the film.

7. A method for conveying a continuous synthetic-resin film comprising the steps of:

stretching the film by an expansion roller into a configuration in which edges of the film are curved with opposite lateral edges having different arc lengths;

loosening stretched film produced by stretching the film;

conveying the stretched film by a plurality of roller units arranged in a direction perpendicular to a conveying direction in which the continuous film is conveyed, each of the roller units being constituted by a lower roller equipped with a driver and an upper roller disposed above the lower roller, the roller units sandwiching the continuous film to convey the continuous film; and controlling a rotation speed of each roller unit so that the film is conveyed at a desired speed and in a desired direction by correcting a rotation speed of each lower roller from a preselected value according to a drift amount of the film in a film lateral direction perpendicular to the conveying direction.

8. A method for conveying a continuous synthetic-resin film, said method comprising the steps of:

arranging a plurality of roller units in a direction perpendicular to a conveying direction of the continuous film, each of the roller units being constituted by a lower roller equipped with a driver and an upper roller disposed above the lower roller, the roller units sandwiching the continuous film to convey the continuous film;

extending the continuous film so that one lateral side of the film is longer than the other lateral side of the film; and controlling a rotation speed of each roller unit so that the film is conveyed at a desired speed and in a desired direction by correcting a rotation speed of each lower roller from a preselected value according to a drift amount of the film in a film lateral direction perpendicular to the conveying direction.

* * * * *